United States Patent [19]

Lee et al.

[11] Patent Number: 4,604,290

[45] Date of Patent: Aug. 5, 1986

[54] MEAT FLAVORING AGENTS AND PROCESS FOR PREPARING SAME

[75] Inventors: Eldon C. Lee; Pierre J. van Pottelsberghe de la Potterie, both of New Milford; John S. Tandy, Kent, all of Conn.

[73] Assignee: Nestec S.A., Vevey, Switzerland

[21] Appl. No.: 528,561

[22] Filed: Sep. 1, 1983

[51] Int. Cl.$^4$ ............................ A23L 1/226; A23L 1/231
[52] U.S. Cl. ................................. 426/533; 426/535
[58] Field of Search ......................................... 426/533

[56] References Cited

U.S. PATENT DOCUMENTS

| | | | |
|---|---|---|---|
| 3,394,015 | 7/1968 | Giacino | 426/533 |
| 3,394,017 | 7/1968 | Giacino | 426/533 |
| 3,532,514 | 10/1970 | May | 426/533 |
| 3,780,184 | 12/1973 | Broderick | 426/533 |
| 3,876,809 | 4/1975 | Mussinan et al. | 426/533 |
| 3,904,655 | 9/1975 | van den Ouweland et al. | 426/533 X |
| 3,957,745 | 5/1976 | Cassan | 426/533 X |
| 4,045,587 | 8/1977 | Katz et al. | 426/533 |
| 4,081,565 | 3/1978 | Chhuy et al. | 426/533 |
| 4,094,997 | 6/1978 | Aishima et al. | 426/533 |
| 4,161,550 | 7/1979 | Bernhardt et al. | 426/533 |

FOREIGN PATENT DOCUMENTS

| | | | |
|---|---|---|---|
| 0143556 | 9/1980 | German Democratic Rep. | 426/533 |
| 0159141 | 2/1983 | German Democratic Rep. | 426/534 |
| 45-08628 | 3/1970 | Japan | 426/533 |
| 1325335 | 8/1973 | United Kingdom | 426/533 |

OTHER PUBLICATIONS

Morton et al, Food Flavours-Part A. Introduction, 1982, Elsevier Scientific Publ. Co.: New York, pp. 325–398.

*Primary Examiner*—Joseph Golian
*Attorney, Agent, or Firm*—Vogt and O'Donnell

[57] ABSTRACT

A meat flavorant is prepared by oxidizing a lipid material to form oxidation products therein, combining the lipid material with a sulfur containing compound and with a source of amino acids including an animal protein hydrolysate and reacting the combined ingredients until substantially all of the oxidation products have been consumed.

10 Claims, No Drawings

MEAT FLAVORING AGENTS AND PROCESS FOR PREPARING SAME

BACKGROUND OF THE INVENTION

1. Field of the Invention

This invention pertains to the field of flavorants and particularly pertains to flavorants which impart cooked meat flavor to foodstuffs. More specifically, the present invention is concerned with the preparation of meat flavorants having increased flavor and aromatic intensity and which more closely resemble the natural flavor and aroma of cooked meat.

2. Description of Related Art

The desirability of providing flavoring agents which closely simulate the flavor and aromatic characteristics of cooked meat has long been recognized. Such flavoring agents may, for example, be employed with non-meat sources of protein so as to make them more palatable and as meat-like as possible. So, too, they may also be employed with meat-containing or meat-based foods or vegetable-type foodstuffs such as condensed soups, dried meats, packaged gravies, casseroles, etc., in order to supplement or enhance these foods whose organoleptic properties may have been affected by their processing.

Various expedients have been suggested in the prior art in attempts to provide flavoring agents having the organoleptic profile of cooked meat. Thus, for example, U.S. Pat. No. 2,934,437 describes the preparation of a meat-like flavor by the reaction of a mixture of monosaccharide and a source of amino acid. U.S. Pat. No. 3,394,015 describes the preparation of a meat-like flavorant from the reaction of a proteinaceous substance with a sulfur-containing compound in the absence of a monosaccharide. U.S. Pat. No. 3,532,514 describes the preparation of a meat-like flavorant from a mixture of an amino acid source, a mono-, di-, tri-, or polysaccharide and an animal or vegetable fat. U.S. Pat. No. 3,394,017 describes the preparation of a meat-like flavorant by reacting thiamine with a sulfur-containing polypeptide or an amino acid mixture derived therefrom and thereafter adding aldehydes and ketones to the product.

These and similar techniques may suffer from a number of disadvantages. Firstly, these meat flavorants may possess only a small fraction of the total flavor and aromatic notes possessed by natural cooked meat. This is attributable, in part, to the particular reactive ingredients employed to produce the flavorants which can provide only a limited number of the required chemical precursors—such as various aldehydes and ketones—which are necessary to obtain the full organoleptic profile of cooked meat.

Moreover, the addition of separately prepared aldehydes and/or ketones to the flavorants in an effort to enhance the organoleptic profile of the flavorant produced is generally uneconomical.

Still further, the intensity or strength of these flavorants may be relatively weak so that a considerable amount of such flavorants would be required to obtain a perceptible flavoring effect upon a foodstuff. This, of course, may be economically undesirable. It would be far more advantageous to employ as little flavorant as possible and still obtain the desired flavoring effect.

SUMMARY OF THE INVENTION

Applicants have discovered a process for preparing flavorants for imparting a cooked meat flavor to foodstuffs which avoids substantially all of the disadvantages that may be associated with the prior art flavorants discussed above.

The process of the present invention economically and desirably utilizes a lipid material, and more specifically an oxidized lipid material, to provide a wide range of chemical precursors which facilitate the preparation of flavorants having the characteristic species which more closely resemble that of natural cooked meat. Still further, the flavorants produced by this process are enhanced and intensified so that a relatively small amount of these flavorants is needed to obtain a desired flavoring effect upon a foodstuff.

More particularly, applicants have found that superior meat flavorants may be obtained by reacting at elevated temperatures a sulfur-containing compound and an oxidized lipid material, such as oxidized triglycerides and/or oxidized unsaturated fatty acid components thereof. The lipid material may be separately oxidized prior to being combined with the sulfur-containing compound or, alternatively, may be oxidized during the reaction step itself after having been combined with the sulfur-containing compound.

The oxidation of the lipid material leads to the formation of a wide range of various hydroperoxides which in turn form a broad range of fatty unsaturated aldehydes and ketones. These carbonyl compounds then react with the sulfur-containing compound(s) to form heterocyclic ring structures which greatly enhance and intensify the characteristic meat flavor and aroma in the flavorants. Moreover, by virtue of employing an oxidized lipid material in the process of the present invention, the unsaturated aldehydes and ketones which are formed are endogenous to the starting lipid material and therefore need not be separately added from some other source.

In a preferred embodiment of the present invention, a source of amino acid is additionally reacted with the sulfur-containing compound(s) and the oxidized lipid material to even further enhance the flavorants produced. In this embodiment, the fatty aldehydes and ketones derived from the oxidized lipid material undergo non-enzymatic browning reactions with the amino acid source to provide an even broader organoleptic profile to the flavorant. As a source of amino acid, enzymatically treated meat hydrolysates are especially preferred. It is noted that in the context of the present invention, the term "meat" also includes fish.

The ability to produce an acceptable flavorant at all, much less, a flavorant which has an even broader organoleptic profile and increased intensity when employing an oxidized lipid material is quite unexpected and contrary to what would be predicted by those skilled in the art. Thus, it has long been recognized that lipid oxidation is a major cause of deterioration in meat, particularly of its organoleptic qualities, resulting in off-flavors and rancidity. Generally, steps are taken to inhibit such undesirable lipid oxidation through the use of metal chelators (e.g., polyphosphates, citric acid, ascorbic acid and EDTA), phenolic antioxidants (propyl gallate, BHA and BHT), tocopherols, vacuum packaging, etc. Still, some oxidation nevertheless takes place during the cooking of the meat.

Yet, in the process of the present invention, rather than avoiding lipid oxidation, steps are actually taken to ensure that oxidized lipids are indeed present in order to form the novel flavorants discovered by applicants. These oxidized lipid materials, typically thought of as being the cause of rancidity, are actually utilized in the process of the present invention to produce flavorants having more intensity and an organoleptic profile more closely resembling that of cooked meat. These oxidation products provide the broad spectrum of precursor compounds—unsaturated aldehydes and ketones—needed to provide the desirable flavorants of the present invention. Hence, instead of providing a limited number of aldehydes and ketones from other sources, as may be taught by the prior art and which are inherently restricted in their scope and range, applicants are able to provide, in situ, a much broader range of such precursor compounds.

The process of the present invention is carried out in such a manner that at the end of the process, the reaction product has a peroxide value of substantially zero. In other words, essentially all of the oxidation products are utilized in the process to produce a flavorant of exceptional intensity and character.

The meat flavorants of the present invention offer the additional advantages of exhibiting shelf stability for over one year at room temperature and do not require refrigeration. Still further, the intensity of the flavorants are four to five times greater than freshly cooked meat on a dry solids basis.

DETAILED DESCRIPTION OF THE INVENTION

The process for preparing the flavorants of the present invention for imparting a cooked meat flavor to foodstuffs comprises combining a lipid material and a sulfur-containing compound to form a mixture and then reacting the mixture to form the flavorant wherein either before or during the reaction step, the lipid material is oxidized by being contacted with an oxidizing agent. In a preferred embodiment, the reaction mixture also contains a source of amino acid.

The lipid material that is employed in the present invention includes triglycerides, unsaturated fatty acids or a combination thereof and may be obtained from a variety of different sources. For example, the triglycerides include, but are not limited to, animal fats such as chicken fat, lard, butter fat, beef tallow and the like; and hydrogenated animal oils prepared from, for example, oils derived from fowl, beef, pork, fish and the like. These triglycerides may be employed alone or in combination with one another. The unsaturated fatty acids that may be employed may be derived from the triglycerides themselves by means of enzymatic breakdown employing lipases which are well known in the art. The formation of free fatty acids derived from triglycerides offers a wide range of precursor compounds for subsequent oxidation which in turn will react with the sulfur-containing compound to form the ultimate flavorant product.

The fatty acids are desirably straight or branch chained acids having from 11 to 24 carbon atoms and at least one unsaturated linkage in the chain. Such fatty acids include, but are not limited to, oleic acid, linoleic acid, linolenic acid, arachidonic acid and the like.

The lipid material is preferably derived from a source which is most closely related to the type of flavorant desired. Thus, where it is desired to produce a chicken flavorant, the triglyceride source that is most preferred is chicken fat. Similarly, in the preparation of a pork flavorant, it will be most desirable to employ pork fat as the source of the lipid material.

The lipid material, be it a triglyceride, an unsaturated fatty acid, or a combination thereof, may then be oxidized and combined with a sulfur-containing compound or, alternatively, may first be combined with the sulfur-containing compound and then be oxidized during the reaction step itself.

The lipid material may be oxidized by being contacted with an oxidizing agent which includes, but is not limited to, contact with gaseous materials such as oxygen, air, ozone, and the like, or solid and liquid oxidizing materials such as hydrogen peroxide, ferrous sulfate, and the like. Oxidizing gases are generally employed in a manner such that the amount of oxygen available is in the range of from about 0.015 to 0.15 lbs/hour and preferably from about 0.02 to 0.06 lbs/hour per kilogram of unoxidized lipid material. Non-gaseous oxidizing agents are generally employed in an amount from about 0.1 to 1.0% by weight based on the weight of the lipid material. The oxidation of the lipid material is carried out at a temperature of about 50° to 120° C. for a period of from about 0.5 to 6.0 hours. Preferably, it is carried out at a temperature of 80° to 100° C. and for a period of from about 1.0 to 2.0 hours.

Regardless of how the lipid material is oxidized or what oxidizing agent is employed to do so, and whether the lipid material is oxidized prior to being combined with the sulfur-containing compound or after, the lipid material is oxidized to the extent that it has a peroxide value in the range of from about 5 to 150 milliequivalents per kilogram of lipid material. Preferably, the lipid material is oxidized to a peroxide value of 7 to 10 milliequivalents per kilogram of lipid material. "Peroxide value" is a conventional term which is well known to those skilled in the art for measuring the degree of oxidation of a material, particularly, lipids. The peroxide value may be determined by the American Oil Chemists' Society Method No. 28.023 as set forth at page 489 of the Official Methods of Analyses of the AOAC (1975), published by the Association of Official Analytical Chemists. Oxidation of the lipid material to the extent recited in the foregoing ranges is required in order to provide the necessary precursors which facilitate the production of the flavorants of the present invention which have increased intensity and a broader organoleptic profile.

As a result of the oxidation of the lipid material, hydroperoxides are formed. These hydroperoxides are generally unstable and decompose to form a wide range of fatty, unsaturated aldehydes and ketones.

From about 0.1 to about 1.0 part by weight and preferably, from about 0.2 to about 0.5 part of a sulfur-containing compound are employed per part by weight of lipid material regardless of whether the lipid material is initially oxidized or oxidized as part of the reaction step.

Suitable sulfur-containing compounds include, but are not limited to, sulfur-containing amino acids, which liberate hydrogen sulfide, lower alkyl mercaptans, or lower alkyl sulfides or disulfides, or may include inorganic sulfur compounds, or hydrogen sulfide itself. Such inorganic sulfur compounds may include the sulfides or hydrosulfides of alkali or alkaline earth metals or ammonium. In the context of the present invention, where a sulfur-containing compound is referred to, it is understood that any one or more of the above-noted sulfur-containing compounds may be employed at any one time to react with the oxidized lipid material.

Specific examples of some sulfur-containing compounds are cysteine, cystine, thiamine, methionine, glutathione, 2-amino-ethane sulfonic acid or their salts, and the like. Sulfur compounds may also be derived from plants of the *allium* or *cruciferae* species.

The mixture of the sulfur-containing compound and the lipid material is then reacted to form the flavorants of the present invention. The reaction is carried out at elevated temperatures, normally, at a temperature in the range of from about 80° to about 120° C. and, more preferably, in the range of from about 85° to about 100° C. for a period of about 0.5 to 2.5 hours and preferably, from about 1.0 to 2.0 hours. The reaction is carried out until the peroxide value of the reacted mixture is essentially zero milliequivalents per kilogram of lipid material.

Provided that an oxidizing agent is brought into contact with the reaction mixture, the reaction conditions are such that in the embodiment where an unoxidized lipid material is combined with a sulfur-containing compound, the lipid material is oxidized during the reaction to form the required oxidation products. As the lipid material is oxidized and is forming oxidation products in situ, such oxidation products are immediately and simultaneously reacted with the sulfur-containing compound to form the desired flavorants. The lipid material may be oxidized in situ by simply bubbling an oxidizing gas such as air or oxygen through the reaction system as it is being heated. Alternatively, an edible liquid or solid oxidizing agent such as hydrogen peroxide or ferrous sulfate may be added to the mixture of unoxidized lipid material and the sulfur-containing compound and then the mixture heated to the reaction conditions, which conditions are essentially the same for oxidizing the lipid material.

The essential difference between a reaction system containing an unoxidized lipid material and one containing a lipid material that has been pre-oxidized is the presence of an oxidizing agent during the reaction of the mixture for the former embodiment. Either way, the sulfur-containing compound reacts with the oxidation products of the lipid material to form heterocyclic ring compounds such as thiophenes, thiazoles, thiazolines, thialdine, trithianes and the like which are primarily responsible for the great enhancement and intensification of the characteristic flavor of cooked meat found in the flavorants of the present invention.

In addition to the two main ingredients of a sulfur-containing compound and an oxidized lipid material (be it formed prior to combination with the sulfur compound or formed in situ during reaction therewith), in order to even further enhance and intensify the flavorants produced in the present invention, it is most desirable to add an amino acid source to the reaction mixture. As a source of amino acid, one may employ a single amino acid which is specifically associated with the desired flavorant or a mixture of various amino acids. Protein hydrolysates may also be employed and animal protein hydrolysates are especially preferred. Hydrolysates are well known and readily obtainable from a variety of proteinaceous materials. Vegetable protein hydrolysates, for example, may be obtained from wheat germ, corn gluten, soy protein, linseed protein, peanut press cake, yeast and the like.

As with the lipid material, the preferred meat protein hydrolysate is advantageously also derived from the animal associated with the desired flavorant. Thus, hydrolyzed chicken meat, for example, would desirably be employed to produce a chicken flavorant. The utilization of fish protein to form fish protein hydrolysates for the production of fish flavorants is also contemplated.

The meat is preferably proteolytically hydrolyzed with any protein-splitting enzyme including exopeptidases, endopeptidases, or enzymes which exhibit both of these types of activity. In addition to proteases, i.e., protein-splitting enzymes, lipases, enzymes which split lipids, may also be employed. As meats contain some fat at least, the fat present may be employed as a source of the required lipid material which will be oxidized during the reaction step after being combined with the sulfur-containing compound. Protein hydrolysis of meat by means of proteases does not affect the fat content thereof. The nature of the fat contained in the meat may be left unchanged and employed as such with the hydrolyzed meat in conjunction with the sulfur-containing compound to be subsequently oxidized. As an alternative, however, the fat may be cleaved by means of lipases to form unsaturated fatty acids which may also serve as the required lipid material.

The amount of proteolytic enzyme material employed is typically in the range of from about 0.001% to 2.0% by weight of the meat employed, with 0.05 to 1.5% being preferred.

The meat is hydrolyzed for a period which is generally in the range of from about 1 to 8 hours and preferably from about 2 to 6 hours. The temperature employed for hydrolysis depends upon the particular enzyme employed but is usually in the range of from about 45° to 65° C. At the end of the hydrolysis period, the enzymes are deactivated by heating the hydrolysis mixture at a temperature of approximately 100° C. for 5 to 15 minutes.

The addition to the reaction mixture of a protease treated meat and, desirably, a meat that has been treated with lipase as well, greatly enhances the flavors that are produced. In this preferred embodiment, where a source of amino acid is added to the reaction mixture, the fatty aldehydes and ketones resulting from the oxidized lipid material, in addition to reacting with the sulfur-containing compounds, also undergo non-enzymatic browning reactions with the amino acids and peptides derived from the hydrolyzed meat. These additional reactions provide for an even broader organoleptic profile of the meat flavorants produced.

The amount of amino acid source employed is in the range of from about 0 to about 90 parts by weight per part of oxidized lipid material employed and is preferably in the range of from about 50 to 70 parts by weight.

It is noted that no water is added to the reaction mixture of the present invention. In the embodiment in which a protein hydrolysate is employed some water may be present, originating from the hydrolysis of the meat. Accordingly, the reaction is essentially carried out in a fatty medium. Additionally, it is also noted that in the process of the present invention, no saccharides are added to the reaction mixture. Applicants have found that the presence of mono-, di-, or polysaccharides in the reaction mixture can detract from the organoleptic quality of the resulting flavor. Hence, saccharides should not be added to the reaction mixture of this invention, although small amounts may be present in the ingredients used themselves.

The reaction is carried out until the peroxide value of the mixture is substantially near zero which is an indication that essentially all of the lipid oxidation products have reacted with the sulfur-containing compound(s), alone or in combination with the optional amino acid source. As is readily apparent, the amount of sulfur-containing compound and optional amino acid source present in the reaction mixture should be at least enough to chemically react with essentially all of the oxidation products of the oxidized lipid materials.

After the reaction has taken place, the flavorant may be used as is, or alternatively, be blended with suitable solvents, thickeners, extenders or carriers such as hydrolyzed plant proteins, malto-dextrins, starches, etc. If desired, flavor potentiators or enhancers such as spices, condiments, monosodium glutamate, 5'-nucleotides and the like may also be combined with the resulting flavorant. Alternatively, some of these additives may also be combined with the mixture prior to the reaction step.

If there is any water present in the reaction product, it may be removed by drying the flavorant material by any conventional means such as by spray-drying, vacuum-drying, or freeze-drying.

Factors which may affect the nature and quality of the flavorants produced include the nature and relative amounts of the lipid material, sulfur-containing compounds and, when employed, the amino acid source, as well as the reaction time and the temperature of the reaction mixture.

The flavorants of the present invention may be incorporated in soups and soup mixes, casserole dishes, canned and frozen vegetables, animal or pet foods, sauces, gravies, stews, simulated meat products, meat spreads and dips, bakery products, replacements for beef, pork, fish, and chicken extracts, and the like.

The amount of a particular flavorant employed will be dependent, of course, upon the specific application. Generally, however, an amount of 0.1 to 4.0% by weight of a flavorant produced by the present invention and preferably, about 0.5 to 1.0% by weight is usually enough to impart a cooked meat flavor to the foodstuff having the intensity, flavor and aroma characteristics that would normally be associated with freshly cooked meat. For example, the addition of about 0.5 to 1.0 parts by weight of a chicken flavorant prepared by the process of the present invention added to a vegetable protein material such as texturized soy protein would impart an organoleptic profile to the soy protein material of freshly cooked chicken.

Having described the basic concepts of this invention the following Examples are set forth to illustrate the same in which the parts and percentages are by weight. These Examples are not, however, to be construed as limiting the invention in any manner.

EXAMPLE 1

This Example is illustrative of an embodiment of the present invention in which the lipid material is oxidized prior to being combined with the sulfur-containing compound.

A flavoring agent having the characteristic flavor and aroma of cooked chicken is prepared from the following constituents:
Chicken fat: 30.00 parts
Hydrolyzed chicken meat: 64.75
L-Cysteine HCl: 5.00
Linoleic acid: 0.25

The hydrolyzed chicken meat is prepared by blending 99.0 parts of chicken meat with 1 part of protease and heating the mixture at 50° C. for 5 hours. After hydrolysis is complete, the enzyme is inactivated by heating the mixture at 100° C. for 10 minutes.

The chicken fat is first oxidized by heating the fat to 100° C. and contacting it with 0.2 standard cubic meter/hr of oxygen until a peroxide value of 10 meq/kg is reached. The remaining ingredients are then added to the oxidized fat and reacted at 100° C. for 2 hours. The reaction is complete and the flavorant produced at the end of 2 hours at which time the peroxide value is zero.

25 parts of the flavorant is then blended with 64.5 parts of hydrolyzed corn protein, 10 parts of malto-dextrin and 0.5 parts of a 50/50% mixture of sodium inosinate and sodium guanylate. The resulting paste is then vacuum-dried to a solids content of 98%.

The resulting flavorant has the characteristic flavor and aroma of boiled chicken. Compared to a similar flavorant prepared without the use of oxidized fat, the oxidized flavorant of this Example has a richer, more full-bodied mouthfeel. The flavorant of this Example also has a stronger, more intense brothy profile, similar to stewed chicken or chicken stock and a noticeable increase in fat flavor.

EXAMPLE 2

This Example illustrates the embodiment of the present invention wherein the lipid material employed is endogenous to the animal protein hydrolysate employed and is oxidized during the reaction step.

A flavorant having the characteristic flavor and aroma of cooked pork is prepared employing the following constituents:
Hydrolyzed pork meat: 92.25 parts
L-Cysteine HCl: 4.00
Thiamine HCl: 2.00
Onion concentrate (65% total solids): 1.50
Linoleic acid: 0.25

The pork meat, containing 80% fat, is first hydrolyzed with 0.5% protease by weight for 8 hours at 50° C. At the end of the hydrolysis reaction, the enzyme is inactivated by heating the mixture for 15 minutes at 100° C.

The hydrolyzed pork meat containing the fat is then combined with the remaining ingredients to form a mixture. The mixture is then brought to a temperature of 100° C. and maintained at that temperature for 2 hours while simultaneously, 0.2 standard cubic meter/hr of air is bubbled through the medium in order to oxidize the fat contained within the hydrolyzed pork meat. At the end of this time period, the flavorant is produced having a peroxide value of zero.

After cooling, the flavorant is blended with the same carriers and additives as set forth in Example 1 and then vacuum-dried to a 98% total solids content.

The resulting flavorant has the flavor and aroma of freshly cooked pork meat. The flavorant has little roast character and instead exhibits a well-cooked meaty character. The flavorant exhibits a brothy character, a meaty, full-bodied profile and a volatile pleasant aroma.

EXAMPLE 3

(COMPARISON EXAMPLE)

The process of Example 1 is repeated with the only exception being that the chicken fat is not oxidized at all. Thus, the peroxide value of the unoxidized chicken fat is only 1 meq/kg. The remaining constituents and process steps set forth in Example 1 are repeated in this Example.

The resulting flavorant produced in this Example, which is not in accordance with this invention, does not have the intensity, aroma and flavor characteristics as that of the flavorant produced in Example 1. The flavorant of this comparison Example exhibits a much weaker profile, a lesser intensity and lacks the meaty, brothy, fatty full-bodied flavor of the flavorant produced in Example 1.

EXAMPLE 4

(COMPARISON EXAMPLE)

The process of Example 2 is repeated with the only exception being that the fat contained within the hydrolyzed pork meat is not subjected to oxidation conditions during the reaction step such that the fat is not oxidized. The remaining constituents and process steps are employed as discussed in Example 2.

The resulting pork flavorant produced in this Example which is not in accordance with this invention lacks the intensity and specificity of the flavorant produced in Example 2. Moreover, the flavorant also lacks the brothy, meaty character and the fatty flavor of the flavorant of Example 2. A taste panel comparing the flavorants of Example 2 and this Example indicated a preference for the Example 2 flavorant, the flavorant produced in accordance with the present invention, at a 95% confidence level.

EXAMPLE 5

A flavorant having the flavor and aroma of cooked liver is prepared employing the following constituents:
Hydrolyzed beef liver: 72.0 parts
L-Cysteine HCl: 3.5
Thiamine HCl: 1.5
Onion concentrate (65% total solids): 3.0
Beef fat: 20.0

The beef liver is first hydrolyzed in the same manner as set forth in Example 1. The hydrolyzed beef liver is then combined with the remaining ingredients and the mixture brought to a temperature of 100° C. and maintained at that temperature for 2 hours while 0.2 standard cubic meter/hour of ozone is bubbled through the reaction medium. At the end of the reaction period, the flavorant is blended with the same carriers and additives as set forth in Example 1.

The flavorant produced has the characteristic flavor and aroma of cooked liver. The flavorant has an earthy, fatty profile which is both intense and aromatic. 1.7 to 1.8 grams of the flavorant produced in this Example can replace at least 2.0 grams of a flavorant prepared without oxidation of the lipids and still achieve the same impact and intensity.

EXAMPLE 6

Example 5 is repeated with the exception that instead of employing beef liver, ground beef is substituted therefor.

The resulting flavorant has an excellent cooked beef, brothy and fatty flavor and an intense aroma.

A taste panel, when comparing the flavorant of this Example with that prepared without oxidation of the lipid materials, found the present flavorant to be more meaty, broth-like and flavorful and to have an increased aroma intensity.

EXAMPLE 7

Example 6 is repeated with the only exception being that the beef fat is oxidized prior to being combined with the remaining ingredients. Thus, the beef fat is contacted with 0.2 standard cubic meter/hr of oxygen for 4 hours at 100° C. to oxidize it to have a peroxide value of 10 meq/kg. Inasmuch as the fat is already oxidized, no further air or oxygen is bubbled through the mixture during the reaction.

When the peroxide value of the reacted mixture is near zero, the reaction is complete and the flavorant produced.

The flavorant produced in this Example and that of Example 6 are indistinguishable from one another. This points out the interchangeability of oxidizing the lipid material either before or during the reaction step.

EXAMPLE 8

This Example is illustrative of the embodiment in which no amino acid source (meat hydrolysate) is employed. It also demonstrates the preparation of the flavorant without the presence of any water.

A flavorant is prepared having the characteristic flavor and aroma of cooked chicken employing the following constituents:
Chicken fat: 97.0 parts
L-Cysteine HCl: 3.0

The chicken fat and L-cysteine HCl are combined and heated to a temperature of 120° C. for a period of ½ hour while simultaneously bubbling 0.1 standard cubic meter/hr of air through the medium. At the end of that period, 10 parts of the flavorant produced are blended with 70 parts hydrolyzed corn protein, 19.5 parts maltodextrin and 0.5 parts of a 50/50% mixture of sodium inosinate and sodium guanylate.

The resulting flavorant has the characteristic flavor and aroma of cooked chicken.

EXAMPLE 9

This Example is illustrative of the embodiment in which a fish flavorant is produced. The particular species of fish employed is dependent upon the particular flavor to be produced.

A flavorant having the characteristic flavor and aroma of fish is prepared employing the following constituents:
Hydrolyzed fish: 72.2 parts
Cod liver oil: 25.0
L-Cysteine HCl: 2.5
Linoleic acid: 0.3

The fish is first hydrolyzed by means of a fungal protease which is employed in an amount of 1% by weight of the fish treated. The hydrolysis is carried out for 6 hours at 50° C. At the end of the hydrolysis treatment, the temperature is raised to 100° C. and maintained at that temperature for 15 minutes to inactivate the enzyme.

The hydrolyzed fish is then combined with the remaining ingredients and heated to a temperature of 100° C. for 1½ hours while simultaneously bubbling air through the system at a rate of 0.15 standard cubic meter/hr. 23 parts by weight of the reaction product is then blended with 60 parts of hydrolyzed corn protein, 16.2 parts malt dextrin and 0.8 parts of a 50/50% mixture of sodium inosinate and sodium guanylate and dried in vacuum to a total solids content of 98% by weight.

The fish flavorant produced has a boiled fish flavor and aroma and is well suited to applications such as chowder where a boiled fish flavor is desired.

We claim:

1. A process for preparing a flavorant for imparting cooked meat or fish flavor to foodstuffs which comprises:

(a) oxidizing a lipid material selected from the group consisting of triglycerides, unsaturated fatty acids and combinations thereof by contacting the lipid material with an oxidizing agent to form oxidation products, the extent of such oxidation corresponding to oxidation of the lipid material to a peroxide value between about 5 and about 150 milliequivalents per kilogram of lipid material;

(b) forming a reaction mixture before or after said oxidizing step by combining the lipid material with a source of amino acids capable of reacting with said oxidation products and with a sulfur-containing compound capable of reacting with said oxidation products, the amounts of said sulfur-containing compound and said amino acids together being sufficient to react with essentially all of the oxidation products produced in said oxidizing step, said amino acid source including an animal protein hydrolysate; and (c) reacting said mixture until substantially all of said oxidation products have been consumed and the peroxide value of the reaction mixture is substantially zero thereby forming the flavorant, said oxidizing step being performed before or during said reacting step.

2. A flavorant composition for imparting a cooked meat or fish flavor to foodstuffs comprising the flavorant obtained by the process of claim 1.

3. The process of claim 1, wherein the reaction mixture includes from about 0.1 to about 1.0 part by weight of the sulfur-containing compound per part by weight of the lipid material.

4. A flavorant composition for imparting a cooked meat or fish flavor to foodstuffs, comprising the flavorant obtained by the process of claim 3.

5. The process of claim 1, wherein said animal protein hydrolysate is obtained by enzymatic hydrolysis.

6. The process of claim 1, wherein the reaction mixture includes up to about 90 parts by weight of the amino acid source per part by weight of the lipid material.

7. The process of claim 1, wherein the sulfur-containing compound is selected from the group consisting of sulfur-containing amino acids, lower alkyl mercaptans, lower alkyl sulfides, lower alkyl disulfides, hydrogen sulfide, the sulfides or hydrosulfides of the alkali or alkaline earth metals or ammonium, and combinations thereof.

8. The process of claim 7, wherein the lipid material is a triglyceride selected from the group consisting of animal fats, hydrogenated animal oils, and combinations thereof.

9. The process of claim 7, wherein the lipid material is selected from the group consisting of unsaturated straight or branch chained fatty acids having from 11 to 24 carbon atoms.

10. The process of claim 7, wherein the mixture is reacted by heating at a temperature of about 80° to about 120° C. for a period of from about 0.5 to about 2.5 hours.

* * * * *